United States Patent [19]

Sugitani

[11] Patent Number: 4,689,642

[45] Date of Patent: Aug. 25, 1987

[54] INK-JET RECORDING HEAD WITH AN ELASTIC INK TANK IN A SEALED CASING HELD AT A PARTIAL VACUUM AND HAVING A BREAKABLE SEAL

[75] Inventor: Hiroshi Sugitani, Machida, Japan

[73] Assignee: Canon Kabushiki Kaisha, Tokyo, Japan

[21] Appl. No.: 716,805

[22] Filed: Mar. 27, 1985

[30] Foreign Application Priority Data

Mar. 30, 1984 [JP] Japan .................................. 59-61138

[51] Int. Cl.⁴ ............................................ G01D 15/16
[52] U.S. Cl. .................................. 346/140 R; 346/1.1
[58] Field of Search ............................ 346/140 R, 1.1

[56] References Cited

U.S. PATENT DOCUMENTS

| 3,482,258 | 12/1969 | Steen ..................................... 346/140 |
| 4,419,677 | 12/1983 | Kasugayama ........................ 346/140 |
| 4,419,678 | 12/1983 | Kasugayama ........................ 346/140 |
| 4,429,320 | 1/1984 | Hattori ................................. 346/140 |
| 4,500,895 | 2/1985 | Buck .................................... 346/140 |

FOREIGN PATENT DOCUMENTS 738745  10/1955  United Kingdom .

Primary Examiner—Joseph W. Hartary
Attorney, Agent, or Firm—Fitzpatrick, Cella, Harper & Scinto

[57] ABSTRACT

An ink-jet recording head comprises an ejection element for forming ink droplets, an elastic ink tank for holding therein ink to be supplied to said ejection element, a casing for containing said ink tank therein, and a communication section detachably mounted to the casing capable of communicating a space between said casing and said ink tank with the outside the casing, wherein the space inside the casing is sealed at a pressure lower than atmospheric pressure until the communication section is detached from the casing.

8 Claims, 9 Drawing Figures

INK-JET RECORDING HEAD WITH AN ELASTIC INK TANK IN A SEALED CASING HELD AT A PARTIAL VACUUM AND HAVING A BREAKABLE SEAL

BACKGROUND OF THE INVENTION

1. Field of the Invention

The present invention relates to improvements in an ink-jet recording head and a method of storing the same.

2. Description of the Prior Art

An ink-jet recording head of the type described above has a construction as shown, for example, in FIG. 1. Referring to FIG. 1, the head has an ejection element 1 for ejecting ink droplets, an elastic ink tank 2 for storing ink 100 and communicating with the ejection element 1, and a casing 3 for storing and holding the ink tank 2 therein. The element 1 has an ink ejection pressure generating element 4 and electrical signal lines 5 connected to the element 4. The ink 100 in the tank 2 is ejected as ink droplets by ejection pressure generated by the element 4 through an ink flow path 6 defined in the element 1. Ink leakaage 8 occurs from an ink ejection orifice 7 of th element 1.

When an ink-jet recording head of this type is delivered or shipped to a customer, the head is normally filled with ink. In this case, the head is generally exposed to the atmosphere. Thus, due to the vibration or changes in atmospheric pressure or temperature during transportation, ink may leak from the orifice 7. Leaked ink may dry, clogging the ejection port and resulting in a defective head. In order to prevent this, measures must be taken to effect special packaging or to provide padding to absorb vibration during transportation.

SUMMARY OF THE INVENTION

The present invention has been made in consideration of this and has as its object to provide an ink-jet recording head and a method of storing the same wherein the distribution of ink-jet recording heads is facilitated, packaging for shipping the heads is simplified and the leakage of ink which commonly occurs conventionally with resultant solidification of ink is prevented, and contamination of the head prior to first time it is used, which is unpleasant to users, is thus prevented.

According to one aspect of the present invention, there is provided an ink-jet recording head comprising an ejection element for ejecting ink droplets, an elastic ink tank for containing ink to be supplied to the ejection element, a casing for holding the ink tank therein, and a communication section for communicating the space between the casing and the ink tank with the outer atmosphere.

According to another aspect of the present invention to provide a method of storing an ink-jet recording head having an ejection element for ejecting ink droplets, an elastic ink tank containing ink to be supplied to the ejection element, and a casing for holding the ink tank, wherein, before the ink-jet recording head is used, the interior of the casing is kept at a negative pressure, and when the head is used, the interior of the casing is communicated to the atmosphere.

DESCRIPTION OF THE PREFERRED EMBODIMENTS

The preferred embodiment of the present invention will be described in detail with reference to the accompanying drawings.

Figure 1:
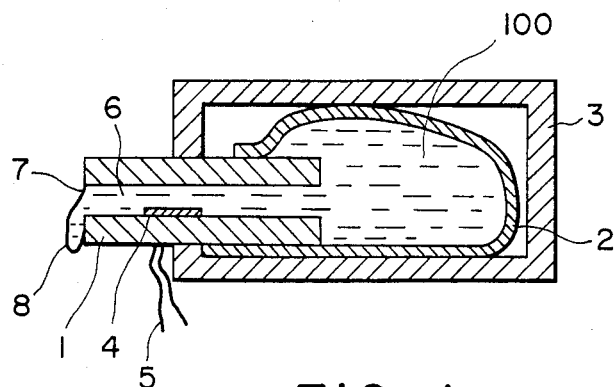
FIG. 1 is a sectional view showing a conventional ink-jet recording head.

FIGS. 2 to 6 are sectional views showing an embodiment of the present invention. The same reference numerals as in FIG. 1 denote the same parts in FIGS. 2 to 6.

Figure 2:
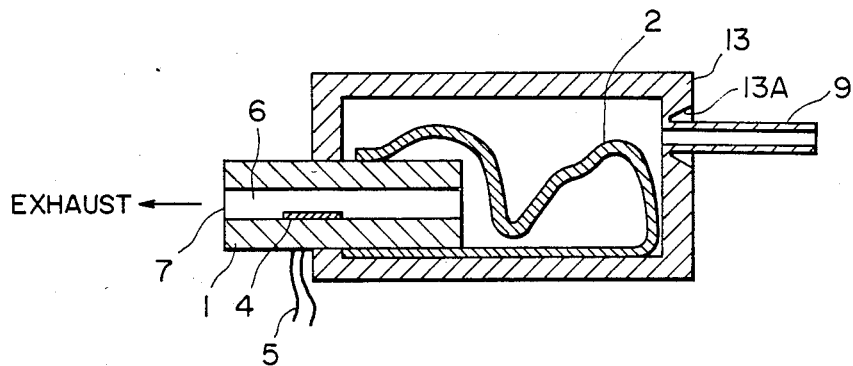
FIGS. 2 to 6 are sectional views showing an ink-jet recording head according to an embodiment of the present invention, and the procedures for paracticing the present invention using this head.
Figure 3:
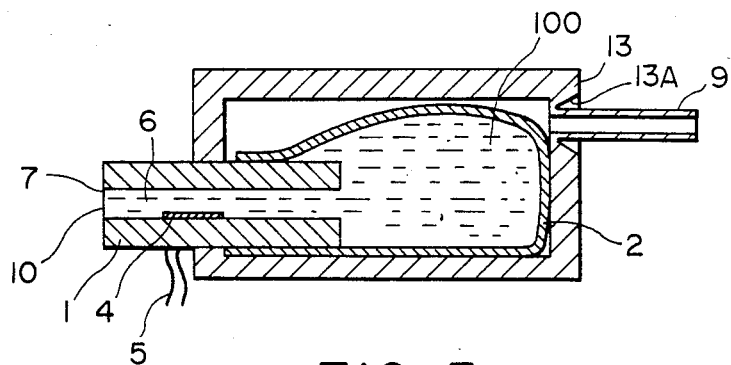

FIG. 2 shows an ink-jet recording head used for practicing the present invention. An ink-jet ejection element 1 is coupled to an elastic ink tank 2. The tank 2 is contained in a casing 13 of a resin, for example, an ABS resin. A hollow communication pipe 9 having a hole communicating with the atmosphere projects outwardly from the casing 13 so as to communicate the interior of the casing with the atmosphere. The wall of the communication pipe is thin. The thickness of the casing 13 at the proximal portion of the pipe 9 is tapered to form a recess 13A with an opening. This allows easy bending of the communication pipe 9. As will be described later with reference to FIG. 6, when the head is used, the pipe 9 can be bent and removed. The pipe 9 comprises a thermoplastic resin such as an ABS resin to allow sealing upon heating According to the present invention, as shown in FIG. 2, a vaccum pump (not shown) is mounted to an ink ejection orifice 7 or an ink flow path 6 communicating therewith so as to exhaust air inside the ink tank 2 and the ejection element 1. As shown in FIG. 3, the ink tank 2 and the ejection element 1 are fillled with ink through the ejection orifice 7 and the path 6 communicating therewith. The ink portion at the distal end of the orifice 7 has a meniscus 10.

Figure 4:
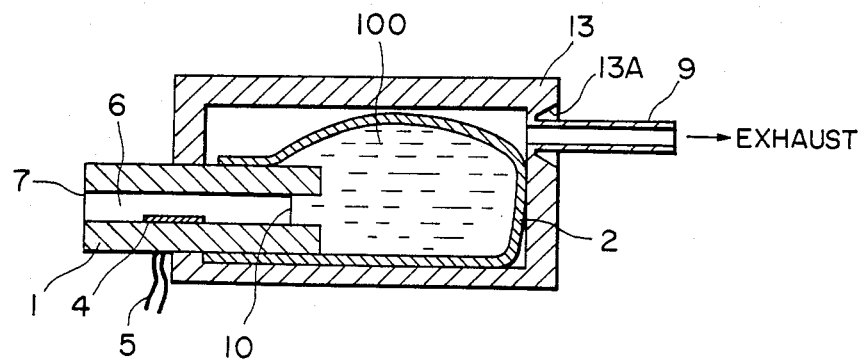

Then, as shown in FIG. 4, a vacuum pump (not shown) is mounted on the communication pipe 9 which is, in turn, mounted on the casing 13, so as to exhaust air inside the casing 13. The degree of exhaustion of air is determined in accordance with the various conditions of the ink-jet recording head such as changes in temperature, atmospheric pressure, vibration or acceleration ; various conditions of the ink-jet path such as the flow resistance defined by the cross-sectional area of the flow path; the viscosity of ink used or surface tension; and the like. In this embodiment, the pressure of the interior of the casing 13 is reduced to 0.8 atm. As a result, the ink meniscus 10 at the orifice 7 is withdrawn toward the interior of the ink tank 2, as shown in FIG. 4.

Figure 5:
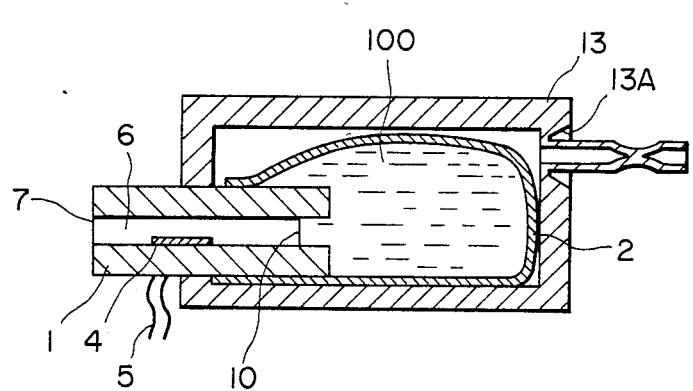

While the interior of the casing 13 is kept at the reduced pressure, the communication pipe 9 is heated and sealed, as shown in FIG. 5. As a result, the interiors of the ink tank 2 and the casing 13 are held at a pressure of 0.8 atm and the meniscus 10 is kept in the state shown in FIG. 5. The head is packaged and shipped in this state.

Figure 6:
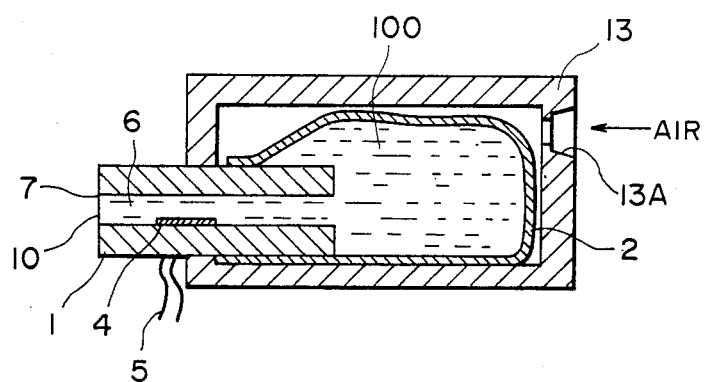

The in-use state of an ink-jet recording head packaged and shipped in this condition after receipt by the user will be described with reference to FIG. 6. Before the head is mounted on a printer, the communication pipe 9 is bent and removed from the casing so as to allow the interior of the casing 13 to communicate with the outer atmosphere through the opening of the recess 13A. The interior of the ink tank 2 which had been kept at a reduced pressure is thus set at atmospheric pressure, and the meniscus 10 shifts to the ejection orifice 7 to allow ink ejection.

In place of a resin described above, the material for the casing can be a material having low air permeability such as a metal.

Figure 7:
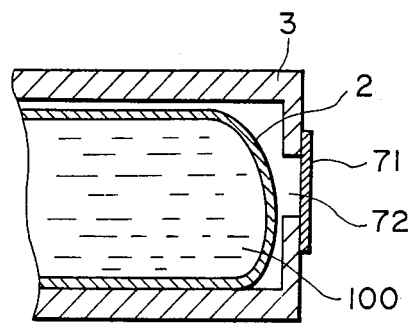
FIG. 7 to 9 are sectional views each showing a communication section and the vicinity thereof in a casing according to other embodiments of the present invention.
Figure 8:
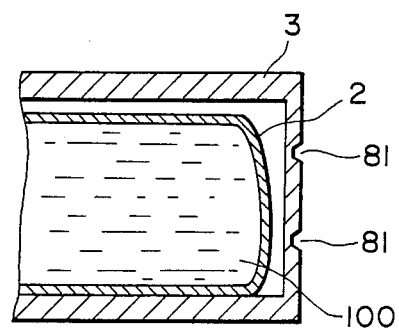
Figure 9:
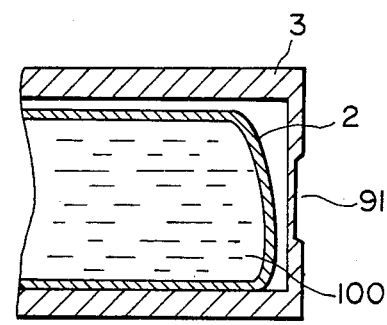

Other embodiments of a communication section according to the present invention will be described with reference to FIGS. 7 to 9. FIGS. 7 to 9 are sectional views each showing a communication section and the vicinity thereof in a casing.

In the embodiment shown in FIG. 7, a communication section 72 is shielded from the atmosphere by a film 71 as a separate member so as to keep the interior of the casing at a reduced pressure. The film 71 preferably comprises a relatively hard material having a low air permeability, such as a resin or a metal. When the recording head having this communication section 72 is used, the film 71 is broken off (when the film 71 has a low strength) or peeled (when the film 71 does not allow easy tearing off) so as to communicate the interior of the casing with the outer atmosphere.

In the embodiment shown in FIG. 8, a groove 81 is formed at a part of a casing 3. The groove 81 as a portion of less strength is broken by an external force so as to communicate the interior of the casing 3 with the outer atmosphere.

FIG. 9 shows am embodiment wherein the film shown in FIG. 7 is combined with the groove shown in FIG. 8. Apart of a casing 3 is rendered thin(as a poriton of less strength) to provide a breaking portion 91. The breaking portion 91 is broken by an external force so as to communicate the interior of the casing 3 with the outer atmosphere. Various other modifications of the communication section can be made. However, with a view to reducing the internal pressure of the casing in a simple manner, sealing of the casing and communication of the casing with the outer atmosphere, a sealed communication pipe as shown in FIG. 5 is preferably used.

In summary, according to the present invention, packaging and shipping procedures for the distribution of ink-jet recording heads are simplified. As a result, the cost of heads is reduced. In addition, conventional problems such as ink leakage from the ejection port, contamination of the ink-jet head with ink, and unpleasant handling difficulties for the user are prevented. Clogging of the ink ejection nozzle by solidification of leaked ink is also prevented.

I claim:

1. An ink-jet recording head comprising:
   an ejection element for forming ink droplets,
   an elastic ink tank for holding therein ink to be supplied to said ejection element,
   a casing containing said ink tank therein and having said ejection element mounted thereto, and
   communication means, detachably mounted to said casing, capable of communicating a space between said casing and said ink tank with the atmosphere outside said casing, wherein the space inside said casing is sealed at a pressure lower than atmospheric pressure until said communication means is detached from said casing.

2. A head according to claim 1, wherein said communication means comprises a sealed communication pipe.

3. A head according to claim 1, wherein said communication means is a portion having less strength than said casing.

4. A head according to claim 3, wherein said portion comprises a film.

5. A head according to claim 3, wherein said portion comprises a groove.

6. A head according to claim 4, wherein said film is a member separate from said casing.

7. A head according to claim 1, wherein said casing is made of a material selected from the group consisting of resins and metals.

8. A method of storing an ink-jet recording head having an ejection element for forming ink droplets, an elastic ink tank for containing therein ink to be supplied to said ejection element, a casing containing said ink tank therein and having said ejection element mounted thereto and communication means, detachably mounted to said casing, communicating a space between said casing and said ink tank with the atmosphere outside said casing, the method comprising the steps of:
   maintaining the interior of said casing sealed at a pressure lower than atmospheric pressure before said recording head is used, and
   communicating the interior of said casing with the atmosphere outside said casing by detaching said communication means from said sealed casing when said recording head is used.

* * * * *

UNITED STATES PATENT AND TRADEMARK OFFICE
CERTIFICATE OF CORRECTION

PATENT NO. : 4,689,642

DATED : August 25, 1987

INVENTOR(S) : HIROSHI SUGITANI

It is certified that error appears in the above-identified patent and that said Letters Patent is hereby corrected as shown below:

AT [57] IN THE ABSTRACT

Line 7, "the outside" should read --the atmosphere outside--.

COLUMN 1

Line 24, "leakaage" should read --leakage--.
Line 25, "th" should read --the--.
Line 57, "to provide" should read --there is provided--.

COLUMN 2

Line 3, "paracticing" should read --practicing--.
Line 27, "pipe" should read --pipe 9--.
Line 36, "vaccum" should read --vacuum--.
Line 36, "to" should read --at--.

UNITED STATES PATENT AND TRADEMARK OFFICE
CERTIFICATE OF CORRECTION

PATENT NO. : 4,689,642

DATED : August 25, 1987

INVENTOR(S) : HIROSHI SUGITANI

It is certified that error appears in the above-identified patent and that said Letters Patent is hereby corrected as shown below:

COLUMN 3

Line 31, "am" should read --an--.
Line 33, "Apart" should read --A part--.

Signed and Sealed this

Fifth Day of April, 1988

Attest:

DONALD J. QUIGG

Attesting Officer

Commissioner of Patents and Trademarks